(12) United States Patent
Goldick (10) Patent No.: US 7,743,038 B1
(45) Date of Patent: Jun. 22, 2010

(54) INODE BASED POLICY IDENTIFIERS IN A FILING SYSTEM

(75) Inventor: Jonathan Scott Goldick, Los Gatos, CA (US)

(73) Assignee: LSI Corporation, Milpitas, CA (US)

( * ) Notice: Subject to any disclaimer, the term of this patent is extended or adjusted under 35 U.S.C. 154(b) by 1019 days.

(21) Appl. No.: 11/212,304

(22) Filed: Aug. 24, 2005

(51) Int. Cl.
*G06F 17/30* (2006.01)
(52) U.S. Cl. .................. 707/694; 709/223; 726/17; 707/797; 707/827
(58) Field of Classification Search .............. 707/3, 707/223, 205; 709/223
See application file for complete search history.

(56) References Cited

U.S. PATENT DOCUMENTS

2002/0147706 A1* 10/2002 Burnett ............... 707/3
2005/0010620 A1* 1/2005 Silvers et al. ............. 707/205
2005/0138162 A1* 6/2005 Byrnes ................ 709/223

OTHER PUBLICATIONS

Jean-Michel Busca, Pastis: a Highly-Scalable Multi-User Peer-to-Peer File System, 2004, pp. 4-7.*
Scalability in the XFS File System, Adam Sweeney, 1996, pp. 1-19.*
U.S. Appl. No. 11/213,386, filed Aug. 24, 2005, Jonathan Scott Goldick, Performance Policies for a Filing System.

* cited by examiner

*Primary Examiner*—Luke S. Wassum
*Assistant Examiner*—Sherief Badawi
(74) *Attorney, Agent, or Firm*—Suiter Swantz pc llo (57) ABSTRACT

A filing system for a storage area network with inode based policy identifiers is disclosed. The filing system includes a processor and a storage device configured to store data. The processor receives an operation to perform on an object of the filing system and retrieves a policy identifier from an inode for the object. The processor then determines a policy from the policy identifier and determines whether execution of the operation is in compliance with the policy. The processor also determines an action to perform based on the determination of compliance with the policy.

27 Claims, 6 Drawing Sheets

INODE BASED POLICY IDENTIFIERS IN A FILING SYSTEM

BACKGROUND

1. Technical Field

The present invention relates generally to filing systems for a data storage networks and more particularly to inode based policy identifiers in a filing system.

2. Description of Related Art

Filing systems have the storage capacity to span terabytes and petabytes of data and contain billions of file system objects. With increasing numbers of file system objects, provisioning and controlling space in the filing system requires more than the traditional notion of quota management. Space management for users, groups, and directory trees needs to be able to scale to larger storage capacities and the increasing number of file system objects.

To provision and control space in the filing system, file servers (e.g., storage area network filers and network attached storage gateways) typically duplicate the namespace of the filing system and store metadata alongside the duplicated namespace. The namespace is space reserved by the filing system to contain the names of file system objects, such as a file, directory, and/or sub-directory. The metadata includes additional information about the file system objects. The metadata is used to determine compliance with space and quota management policies, such as disk usage quotas and access control to a file.

Often, the file servers depend on maintaining external databases that duplicate the namespace of the filing system. When the namespace grows to millions or billions of objects, the external databases fail to scale to the increased number of file system objects. The external databases grow too large to provide rapid access to the duplicated namespace. The file system latency is increased because the external database and the namespace of the filing system are referenced when performing file system operations. Additionally, the file servers often require some limited file system integration, such as mechanisms provided by NetApp and Windows, to intercept the file system operations and for notifications of changes to the namespace such that duplication of the namespace is possible.

Because the external databases typically do not scale to the increasing storage capacities, the file servers may store the metadata in the file system itself. In one example, the size of an inode of a file system object is increased to additional space for storing the metadata. Increasing the size of the inode, however, increases the memory and disk footprint of the filing system and decreases the efficiency of file system caches. In another example, resource forks such as in Apple's Hierarchical File System Plus (HFS+) and Microsoft's New Technology File System (NTFS) extended attributes, allow metadata storage in a separate part of the file system. Similarly, parallel metadata files, which are files stored in the filing system with extended attributes similar to an inode of a file system object, are used to add information to the namespace. However, the metadata stored by the resource forks and the parallel metadata files are stored at a different location than the namespace which, much like the external databases, reduces locality of access and increases latency. The file server accesses different locations for both the namespace and the metadata during file system operations.

SUMMARY OF THE INVENTION

The invention addresses the above problems by providing a filing system for a storage area network with inode based policy identifiers. The filing system includes a processor and a storage device configured to store data. The processor receives an operation to perform on an object of the filing system and retrieves a policy identifier from an inode for the object. The processor then determines a policy from the policy identifier and determines whether execution of the operation is in compliance with the policy. The processor also determines an action to perform based on the determination of compliance with the policy.

In some embodiments, the object comprises a file. The object may also comprise a directory. Advantageously, the filing system quickly retrieves inode based policy identifiers from the inode of the file system object, such as a file, directory, and/or sub-directory. The policy identified by the inode based policy identifier may comprise a quota. The processor may further be configured execute the operation.

In some embodiments, the action comprises generating and transmitting a message indicating the determination whether execution of the operation is in compliance with the policy. The processor may further be configured to receive user input to define the policy for the filing system and determine the policy identifier for the policy. The processor then determines where in the inode to store the policy identifier and stores the policy identifier in the inode.

The processor further may be configured to transmit a policy query including the policy identifier to a policy database and receive a policy query result indicating the policy. The filing system may further comprise the policy database configured to receive the policy query in the policy database and transmit the policy query result based on the policy identifier.

A method is provided for operating a filing system for a storage area network. The method includes receiving an operation to perform on an object in the filing system and retrieving a policy identifier from an inode for the object. The method further includes determining a policy from the policy identifier, determining whether execution of the operation is in compliance with the policy, and determining an action to perform based on the determination of compliance with the policy.

A software product is provided for a storage area network filing system. The software product includes file system software operational when executed by a processor to direct the processor to receive an operation to perform on an object of the filing system. The file system software directs the processor to retrieve a policy identifier from an inode for the object and determine a policy from the policy identifier. The file system software further directs the processor to determine whether execution of the operation is in compliance with the policy and determine an action to perform based on the determination of compliance with the policy.

The filing system with inode based policy identifiers therefore provides a reduced memory and disk footprint in the storage area network because the policy identifiers are stored in the same location as the namespace. The policy identifies are stored in the inode of the file system object rather than in separate and/or parallel metadata which increases the locality of access. Furthermore, the size of the inode is not increased to store an arbitrary number of policy identifiers in the inode to provide better efficiency for file system caches. Moreover, resource forks in the file system and parallel metadata are not required because changes to the namespace and policy identifier storage may be made in the inode of the file, directory, and/or sub-directory, and not duplicated to an external database or to the parallel metadata.

DETAILED DESCRIPTION OF THE INVENTION

The present invention provides a filing system for a storage area network with inode based policy identifiers. In order to better understand the present invention, aspects of the within which the invention operates will first be described. The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

Figure 1:
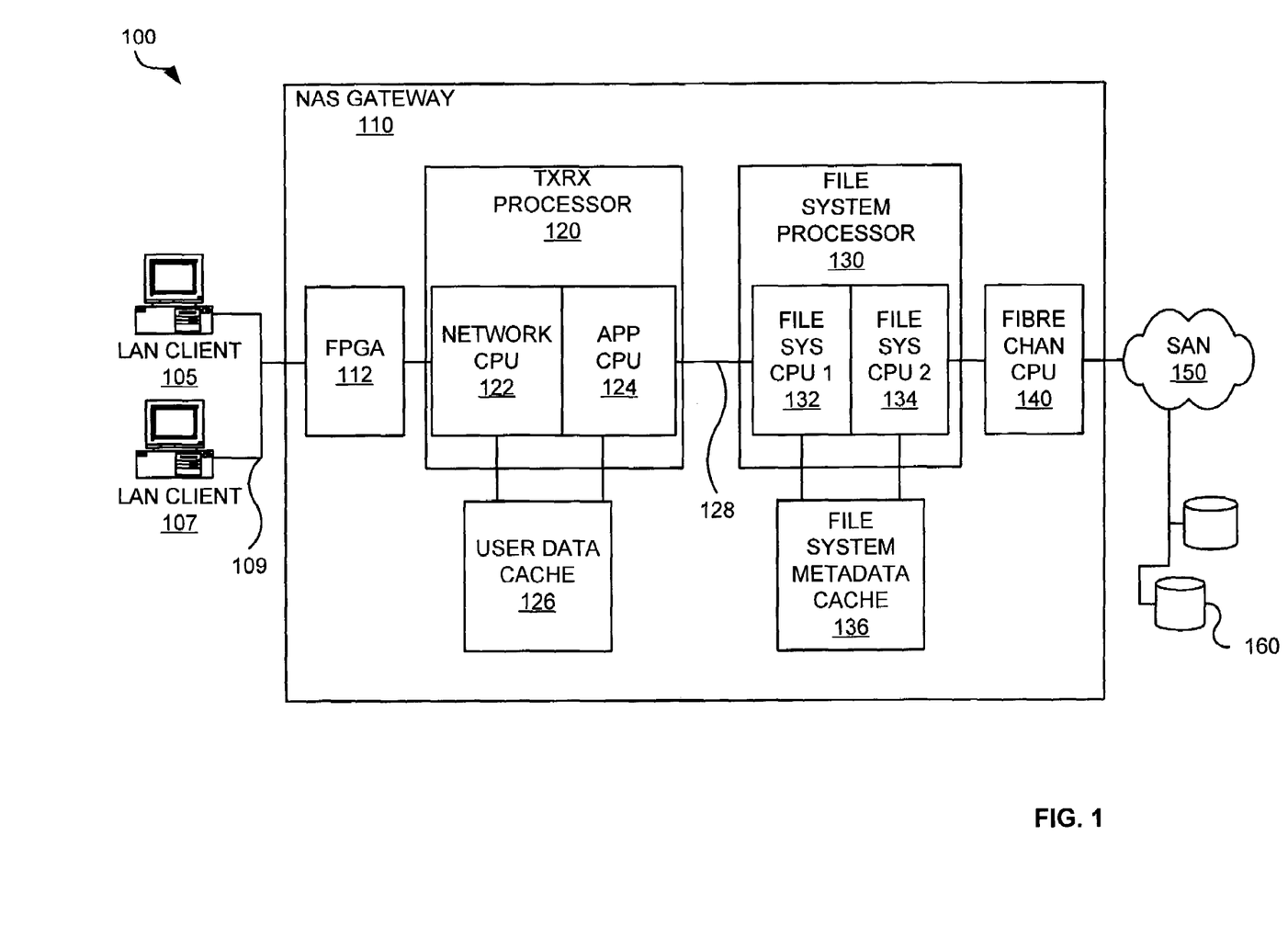
FIG. 1 is an illustration of a system with a network attached storage (NAS) gateway in an exemplary implementation of the invention.
Figure 2:
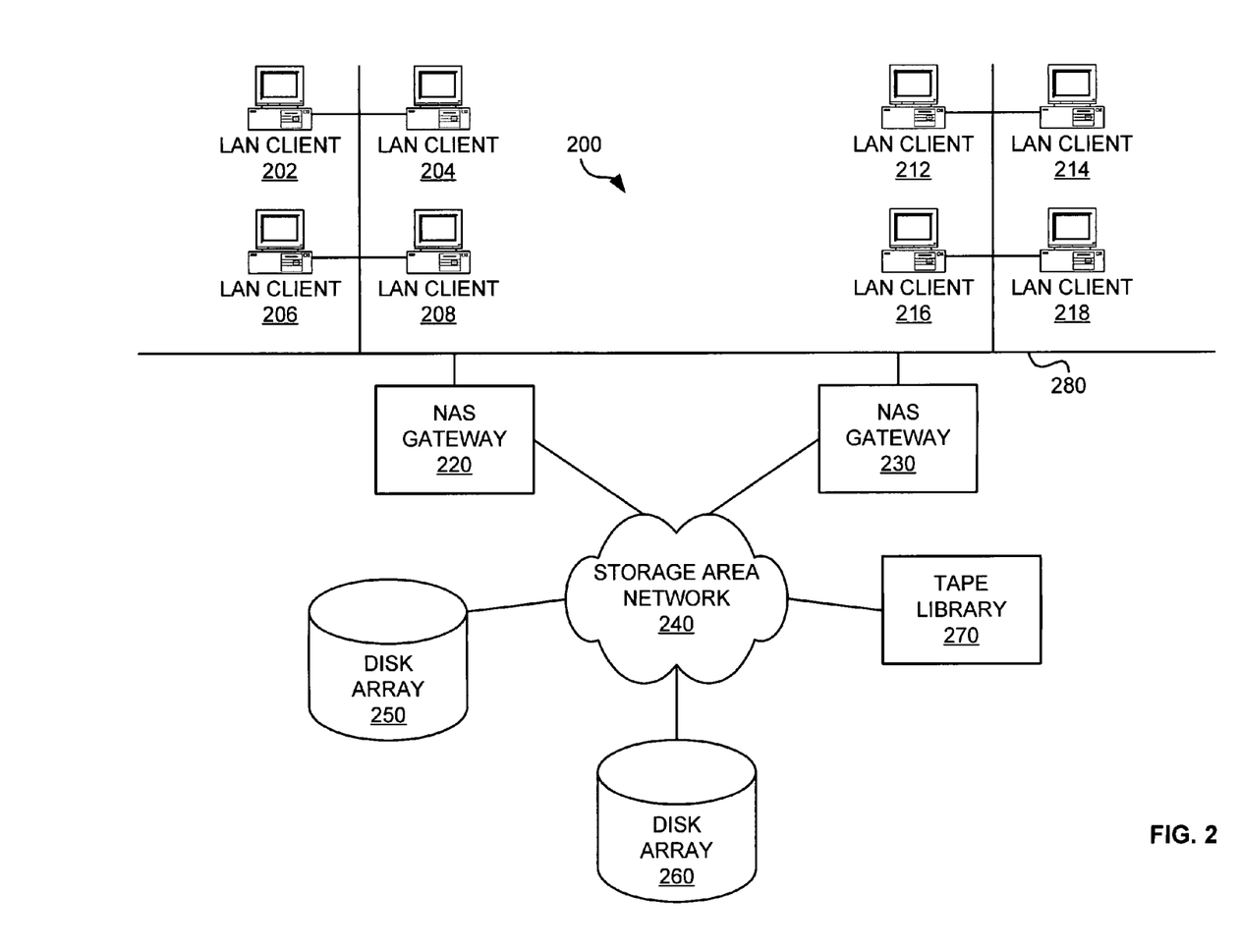
FIG. 2 depicts an illustration of a system with multiple NAS gateways in an exemplary implementation of the invention.

NAS Gateway Configuration and Operation—FIGS. 1-2

FIG. 1 is an illustration of a system 100 with a network attached storage (NAS) gateway 110 in an exemplary implementation of the invention. The system includes a local area network (LAN) client 105, a LAN client 107, the NAS gateway 110, a SAN 150, and storage devices 160.

A LAN client 105 and a LAN client 107 are coupled to the NAS gateway 110 via a LAN 109. In various embodiments, numerous LAN clients 105 and 107 are coupled to the LAN 109. Only two LAN clients 105 and 107 are shown in FIG. 1 for the sake of simplicity. Other embodiments include any communication network to which clients are connected.

The NAS gateway 110 is coupled to a SAN 150. Although only one NAS gateway 110 is shown, other embodiments comprise a number of NAS gateways 110 coupled between numerous LAN clients and multiple SANs. Although only one SAN 150 is shown for clarity, in various embodiments, there may be numerous SANs 150 coupled to the NAS gateway 110. There are numerous storage devices 160 such as tape drives, disk drives, disk arrays, tape libraries, and other dedicated and/or shared storage resources that may be coupled to the SAN 150, but they are not shown for the sake of simplicity and clarity. Other embodiments include any storage network where storage resources are connected in addition to the SAN 150.

The exemplary NAS gateway 110 comprises a field-programmable gate array (FPGA) 112, a TXRX processor 120, a file system processor 130, a user data cache 126, a file system metadata cache 136, and a fibre channel central processing unit (CPU) 140. The NAS gateway 110 is configured to receive a network message in a network protocol from a client (e.g., the LAN client 105). The network message is any message or instruction in a network protocol that indicates a request for a file system object. The network protocol is a set of standards or rules determining the format and transmission of data over a communications network. The network protocol of the exemplary embodiment follows Transmission Control Protocol/Internet Protocol (TCP/IP), but may conform to any network protocol, for example, User Datagram Protocol (UDP). The FPGA 112 of the NAS gateway 110 is coupled to the LAN 109 for error correction of received network messages, such as verifying a checksum of the TCP/IP network message.

The TXRX processor 120 includes a network central processing unit (CPU) 122 and an applications CPU 124. In one embodiment, the network CPU 122 comprises a single-threaded state machine to perform network protocol processing, such as TCP/IP fragmentation correction, to result in the request for the file system object in the file system protocol to the applications CPU 124. The request for the file system object is any operation for the file system object, and may include without limitation a file creation request, a file rename request, a file write request, a directory request, a file storage request, and a file retrieval request. In one embodiment, the applications CPU 124 comprises a single-threaded state machine that processes the request for the file system object in the file system protocol. The file system protocol is any protocol defining operations to be performed on file system objects. Some examples of the file system protocol are Common Internet File System (CIFS), Network File System (NFS), Network Lock Manager (NLM), or Network Status Monitor (NSM) protocols.

The network CPU 122 and the applications CPU 124 are each coupled to a user data cache 126. In some embodiments, the user data cache 126 comprises 2 GB or 4 GB of memory. The network CPU 122 is configured to write to a first partition (not shown) of the user data cache 126 for network protocol (e.g. packet) processing. The applications CPU 124 is configured to write to a second partition (not shown) of the user data cache 126, for example for state information required by NFS or CIFS (e.g., to denote that CIFS currently has a certain file system object open). The remainder of the user data cache 126 is allocated to storage of file system objects. The network CPU 122 and the applications CPU 124 are each configured to read from the entire address space of the user data cache 126, including both the first partition and the second partition.

By allocating specific memory partitions for each CPU of the TXRX processor 120, the NAS gateway 110 architecture advantageously optimizes cache memory usage without mirroring cache memory. For example, if the request from the LAN client 105 corresponds to a file write request, the network CPU 122 may assemble the corresponding request for the file write request, store the file write request in the user data cache 126, and then communicate to the applications CPU 124 that the file write request has been received from the LAN client 105. The applications CPU 124 may read the file write request directly from the user data cache 126, without mirroring the first partition to a separate memory space directly accessible to the applications CPU 124.

The TXRX processor 120 communicates with the file system processor 130. In one embodiment, the TXRX processor 120 communicates via a Hyper Transport connection 128 with the file system processor 130. In one embodiment, the file system processor 1320 comprises two threaded Symmetric Multiprocessing (SMP) processors, a file system CPU 132, and a file system CPU 134, supporting up to 8,000 simultaneous threads.

The file system processor 130 drives a journaling file system to determine the storage location of the file system object in the storage network, for example a disk 160 of the SAN 150, based on a description of the file system object. A file system metadata cache 136 stores inodes of substantially all file system objects stored in the storage network, identified by an inode number (i-number) in the storage network where the file system object resides, with information such as user and group ownership, access mode (e.g., read, write, and execute permissions), file length, time of last write/read, etc. The file system metadata cache 136 includes inodes for substantially all file system objects in the storage network because searching for an inode at an unknown location in the storage network may require significant processor time and system resources.

The file system processor 130 if further configured to manage directories and snapshots in the file system metadata cache 136. Snapshots are for copy-on-write. For example, a block of data on the disk 160 may have multiple references. To prevent a reference from operating on bad data, the file system processor 130 prevents modification of the block of data by a first reference if a second reference is reading the block. Rather than merely preventing the modification of the block of data, the file system processor 130 may write data from the first reference to a second block, and may indicate in the file system metadata cache 136 that the second block is writable.

The fibre channel CPU 140 comprises a storage processor coupled between the file system processor 130 and the storage network (e.g., the SAN 150). The fibre channel CPU 140 is configured to receive the storage location of the file system object from the file system processor 130 and convert the storage location into one or more commands to the SAN 150. In various embodiments, the commands comprise storage networking protocols such as FC1 to FC4 or SCSI commands.

The fibre channel CPU 140 of one embodiment comprises four processor slices. In another embodiment, the fibre channel CPU 140 comprises a single processor. The number of fibre channel CPU 140 processors or slices is selected to approximate the data rate of the LAN 109. In some embodiments, the NAS gateway 110 includes one or more fibre channel ports to interface with the SAN 150.

One feature of the NAS gateway 110 is that information related to the request for the file system object is stored in a non-volatile shared memory in the storage network, for example in a memory (not shown) of the disk 160, one of a redundant array of independent disks (RAID) of the SAN 150. RAID storage units typically include large amounts of either non-volatile random access memory (NVRAM) or battery-backed cache memory to achieve high performance, as well as redundant power supplies for fault tolerance. In some embodiments, the NAS gateway 110 takes advantage of the fact that RAID disks include large amounts of memory and stores information related to the request for the file system object to the RAID non-volatile memory. Advantageously, with each additional RAID array added in the SAN 150, the memory available for storage of information related to requests scales up. Further, the RAID array itself manages memory and disk transfers. For example, if a RAID disk battery is running low, then the RAID stores data to the physical disk media independently, without requiring support from the NAS gateway 110. Furthermore, for a cluster of NAS gateways 110 coupled to the SAN 150, any of the NAS gateways 110 may read data from the RAID disk, so that the RAID disk memory is shared among all of the NAS gateways 110 in the cluster.

FIG. 2 depicts an illustration of a system 200 with multiple NAS gateways in an exemplary implementation of the invention. The system 200 includes LAN clients 202, 204, 206, and 208, LAN clients 212, 214, 216, and 218, NAS gateway 220, NAS gateway 230, storage area network 240, disk array 250, disk array 260, and tape library 270. A network link 280 interconnects the LAN clients 202, 204, 206, and 208, the LAN clients 212, 214, 216, and 218, the NAS gateway 220, and the NAS gateway 230. The SAN 240 is connected to the NAS gateway 220, the NAS gateway 230, the disk array 250, the disk array 260, and the tape library 270.

Only two NAS gateways 220 and 230 are shown in FIG. 2 for the sake of simplicity. Other embodiments may include numerous NAS gateways to expand file storage. One advantage the NAS gateways 220 and 230 provide is high system availability through filer and/or gateway pooling. A multiple NAS gateway configuration such as the system 200 in FIG. 2 eliminates single points of failure in two ways. First, the multiple NAS gateway configuration permits users or servers to access data through any NAS gateway in a multiple-gateway environment. If the NAS gateway 220 is taken off-line or is experiencing excessive workload, users may easily be migrated to another NAS gateway 230 with no changes in IP address or server names required. For example, if LAN client 202 is accessing the disk array 260 through the NAS gateway 220 and the NAS gateway 220 fails or is overloaded, the LAN client 202 can still access the disk array 260 through the NAS gateway 230.

Second, NAS gateway pooling means that any NAS gateway can access data from any storage array. In the NAS gateway environment such as system 200, all data, including file system directories and metadata, are stored on shared devices accessible over the SAN 240. Any NAS gateway can access the data regardless of which NAS gateway stored it. Because NAS gateways offer petabyte addressability, each NAS gateway has essentially unlimited ability to directly access large pools of data. Unlike most virtual file system implementations, no redirection by another filer/gateway or metadata server is required. By eliminating both single-points-of-failure and performance bottlenecks, this architecture creates a highly robust storage environment.

Inode Based Policy Identifiers—FIGS. 3-5B

Figure 3:
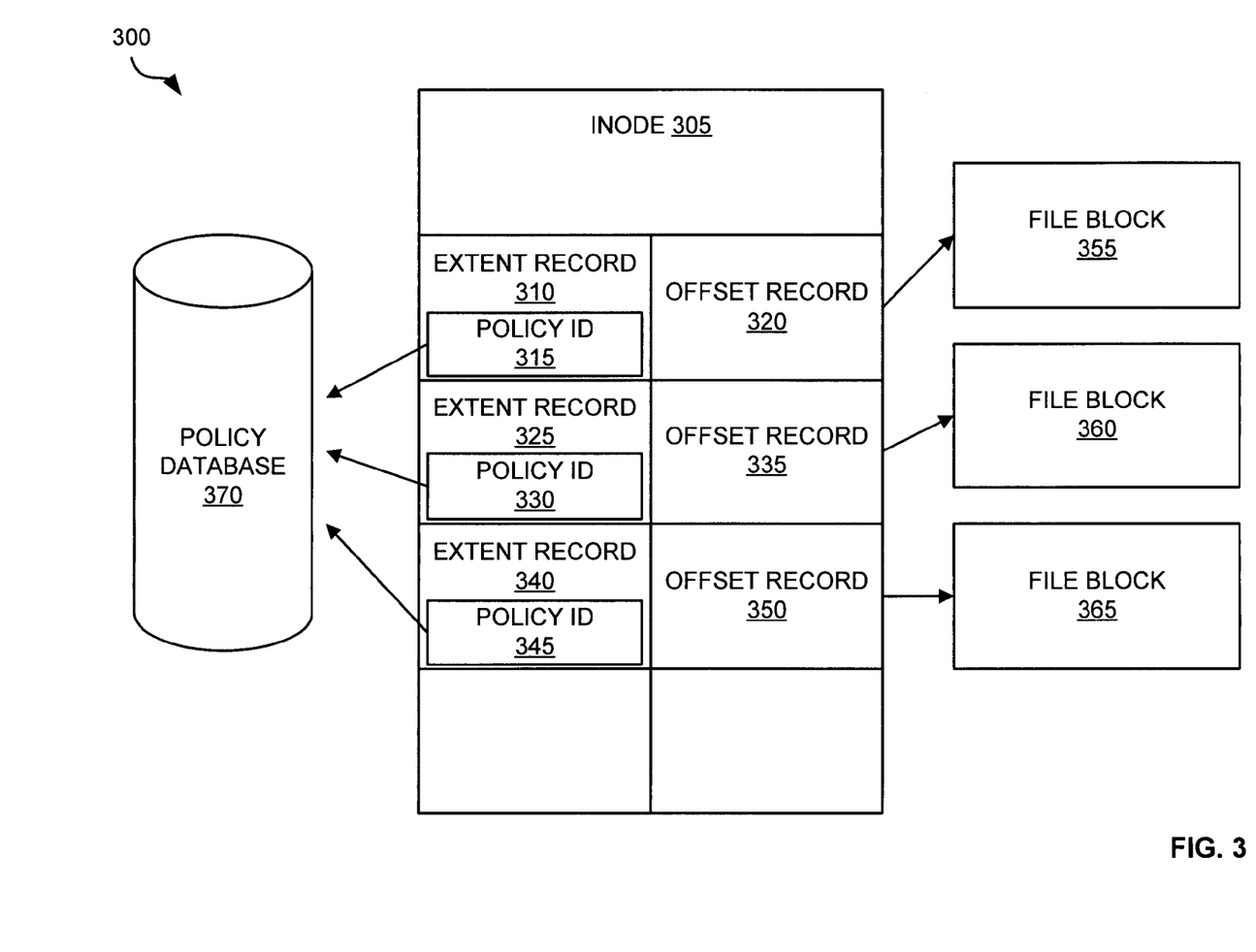
FIG. 3 is an illustration of an inode based policy identifier system in an exemplary implementation of the invention.

FIG. 3 is an illustration of an inode based policy identifier system 300 in an exemplary implementation of the invention. The inode based policy identifier system 300 includes an inode 305, a file block 355, a file block 360, a file block 365, and a policy database 370. Only one inode (e.g., the inode 305) is illustrated in FIG. 3 for the sake of simplicity. Other embodiments may include multiple inodes, direct inodes, and indirect inodes. The inode 305 is located, for example, in the file system metadata cache 136 (FIG. 1). In some embodiments, the inode 305 is located in the storage devices 160 (FIG. 1). The file blocks 355, 360, and 365 may be stored in the SAN 150. The policy database 370 may be located in the NAS gateway 110, or external to the NAS gateway 110.

The inode 305 includes one or more entries having an extent record (e.g., extent records 310, 325, and 340) and an offset record (e.g., offset records 320, 335, and 350). Each of the extent records includes a policy identifier (ID) (e.g., policy IDs 315, 330, and 345). The extent record 310 and the offset record 320 address data stored in the file block 355. The extent record 325 and the offset record 335 address data stored in the file block 360. The extent record 340 and the offset record 350 address data stored in the file block 360.

The inode 305 is any file system data structure designated to store information defining a file system object, such as a file, directory, and/or other file system object. In one example, the inode 305 includes file size information, where the file system object resides (e.g., the file blocks 355, 360, and 365), user and group ownership information, access mode (e.g., read, write, and execute permissions), and time of creation, access and/or modification. The inode 305 may include part of b+tree describing the storage of file system objects in the file system. A b+tree is a balanced search tree in which every node (e.g., the inode 305) has between the smallest whole number greater than or equal to (M/2) and M children, where M>1 is a fixed integer, and in which keys (e.g., the extent record 310 and the offset record 320) are stored in the leaves (i.e., nodes without children).

The extent records 310, 325, and 340 are any structures or objects that define a start location for a contiguous portion of the file system object. The extent records 310, 325, and 340 may also define the size of the contiguous portion. The offset records 320, 335, and 350 are any structures or objects that define an offset location from the start location for the contiguous portion of the file system object. In one example, the extent records 310, 325, and 340, and the offset records 320, 335, and 350 are each 64-bit fields in the inode 305.

The policy IDs 315, 330, and 345 are any numbers, references, identifiers, or symbols that identify a policy. For example, the policy IDs 315, 330, and 345 are 32-bits of the extent records 310, 325, and 340, respectively that identify one or more policies in the policy database 370. In some embodiments, the policy IDs 315, 330, and 345 are 32-bits of the offset records 320, 335, and 350.

The policy IDs 315, 330, and 345 may each have a corresponding Policy identifier attribute. A policy, identifier attribute is any number, reference, identifier, or symbol that identifies an attribute or property of the policy identified by the policy identifier. For example, the policy identifier attribute comprises the first 10 bits of the policy identifier. In another example, the policy identifier attribute comprises a bit mask stored in the inode 305. The policy identifier attribute allows the NAS gateway 110 to quickly determine whether to look up a policy in the policy database 370 based on the policy identifier attribute. For example, if a policy identifier attribute indicates that a policy identifier is not associated with a particular category of file operations (e.g., write operation), the NAS gateway 110 then does not waste time performing unnecessary look ups of the policy in the policy database 370.

The policy database 370 is any system, database, or storage device that stores policies. The policies may be accessed in the policy database 370 by the policy IDs 315, 330, and 345. A policy is any quota, threshold, rule, and/or conditions used to manage access to or control file system resources. A policy may provide space management and may be based on disk space quotas, percentages of file system space, user and group privileges, file system operations, security privileges, date and time, and a relationship to another policy.

One example of a policy is a space management policy that tracks and provides quotas based on a file extension. For example, the space management policy limits the size or creation of ".MP3" files. Another example of a policy is to allow quotas to be set in terms of a percentage of the file system size. A policy may allow quotas to be set in terms of a percentage of a patent policy limit. Another policy may combine user, group, and/or tree create rules with a file extension. For example, the policy disallows the creation of certain file types (i.e., with the prohibited file extension) in certain directory trees, or by the specific user and/or group. Deny-read, deny-write, deny-rename, deny-link, allow-read, allow-write, allow-rename, and allow-link policies may be set by file extension, quota, quota tree, user, and group.

The NAS gateway 110 advantageously determines applicable policies from the policy IDs 315, 330, and 345. The policy IDs 315, 330, and 345 are read from the inode 305 and the policies to which the policy IDs 315, 330, and 345 are determined from the policy database 370. Storing the policy identifiers in the inode 305, rather than in a separate metadata file or parallel metadata inode, increases access proximity and decreases latency. Furthermore, because the size of the inode 305 is not increased to store the policy identifiers, memory and disk footprints are conserved and caching efficiency increases.

Figure 4:
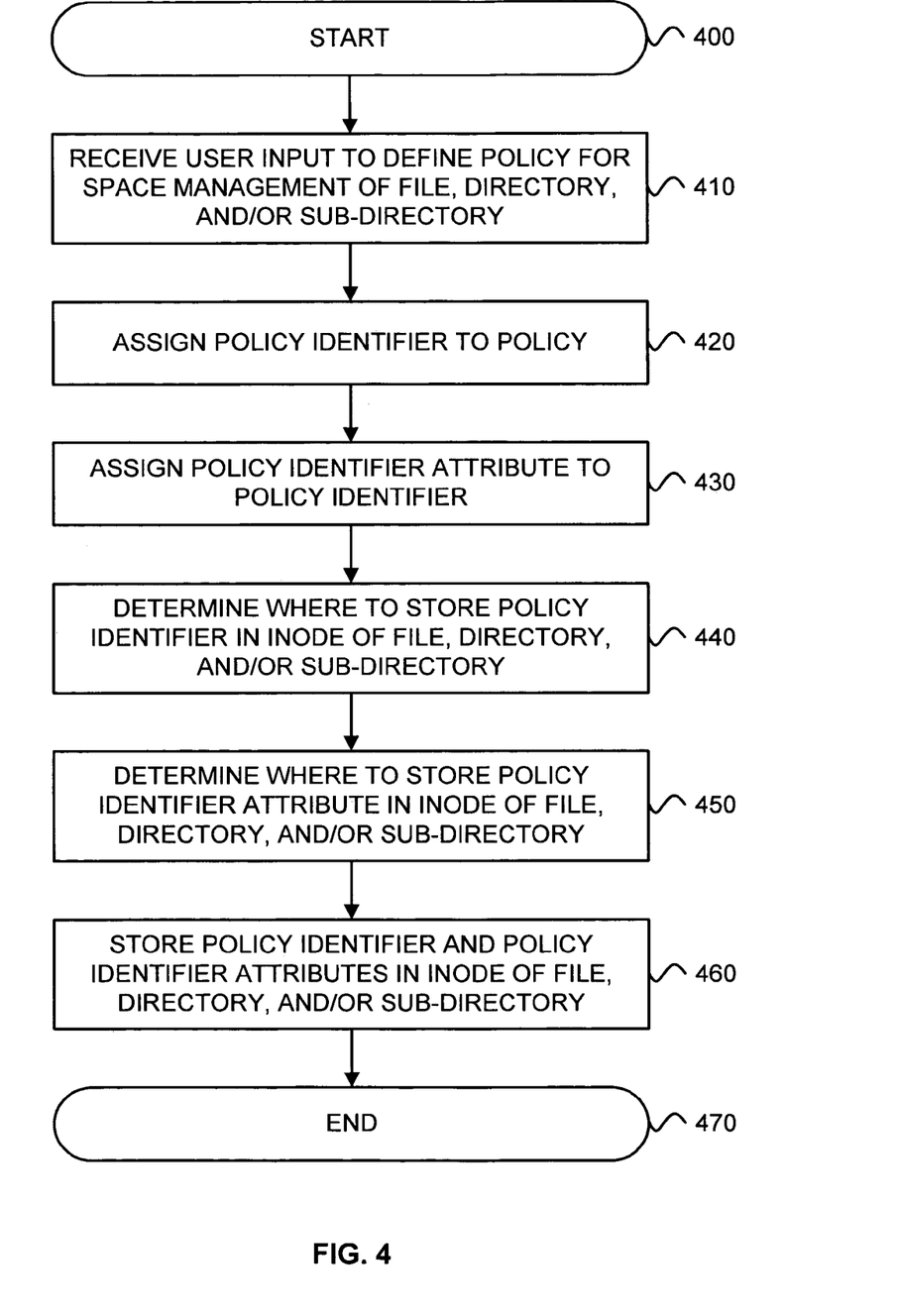
FIG. 4 is a flowchart illustrating a method of operation of the NAS gateway for storing policy identifiers in an inode in an exemplary implementation of the invention.

FIG. 4 is a flowchart illustrating a method of operation of the NAS gateway 110 for storing policy identifiers in an inode (e.g., the inode 305 of FIG. 3) in an exemplary implementation of the invention. FIG. 4 begins in step 400. In step 410, the NAS gateway 110 receives user input to define a policy for space management of a file system object, such as a file, directory, and/or sub-directory. The user defines the policy with one or more rules to be met for compliance with the policy.

For example, the user (e.g., the file system administrator) defines a file extension policy in which files with an "MP3" extension cannot be read, written, created, and linked in the "Accounting" directory. File system operations by users to create or store files with the "MP3" extension in the "Accounting" directory violate the policy. In another example, the administrative user limits the percentage of disk storage space for ".MPG" files in home directories of users of the system 100 to fifty percent of the disk quota allocated to each user.

In step 420, the NAS gateway 110 assigns a policy identifier (e.g., the policy ID 315) to the policy. In step 430, the NAS gateway 110 assigns a policy identifier attribute to the policy identifier 315. For example, the file extension policy in which users may not create and store files with an "MP3" extension in the "Accounting" directory, is triggered by file system operations create and rename. A read file system operation, however, may not invoke the file extension policy. The NAS gateway 110 assigns the policy identifier attribute to process the policy identifier 315 for the create and rename file system operations, and not to process the policy identifier 315 for the read file system operation.

In step 440, the NAS gateway 110 determines where to store the policy identifier 315 in the inode 305 of the file, directory, and/or sub-directory. In step 450, the NAS gateway 110 determines where to store the policy identifier attribute in the inode 305 of the file, directory, and/or sub-directory. In step 460, the NAS gateway 110 stores the policy identifier 315 (e.g., in the extent record 310 of FIG. 3) and the policy identifier attribute in the inode 305 of the file, directory, and/or sub-directory. FIG. 4 ends in step 470.

Storage of the policy identifier 315 in the inode 305, in the example, leverages the b+ tree already present in the inode 305 for use in locating where a file's data is stored in the filing system. Since the b+tree is already compact, extensible, provides fast lookup, and is generally contiguous with the inode 305 itself, by using space bits, the policy identifiers may be stored within the b+tree records for similar extensibility and fast retrieval.

Figure 5A:
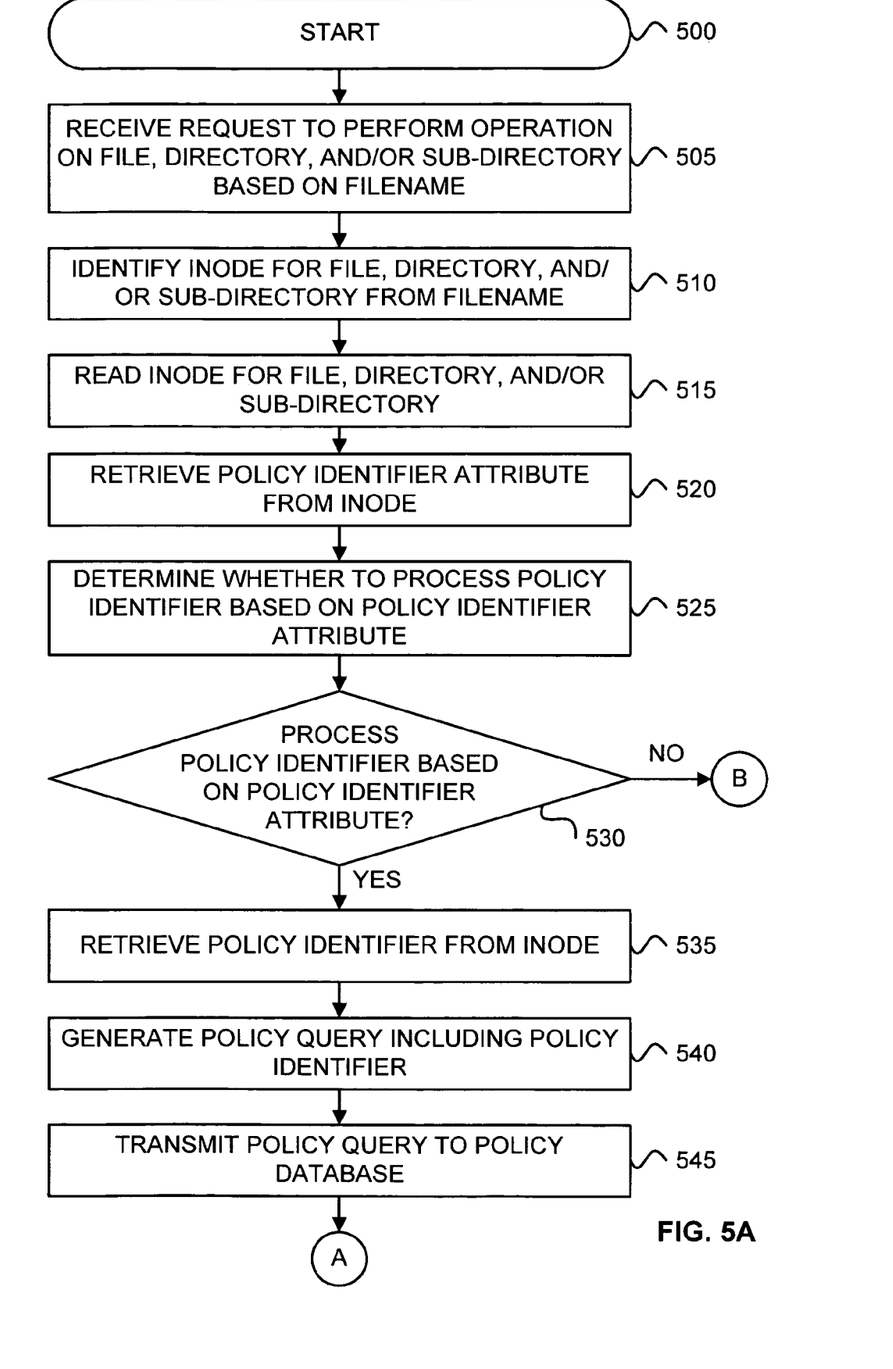
FIGS. 5A and 5B are flowcharts illustrating a method of operation of the NAS gateway for retrieving policy identifiers in an inode in an exemplary implementation of the invention.
Figure 5B:
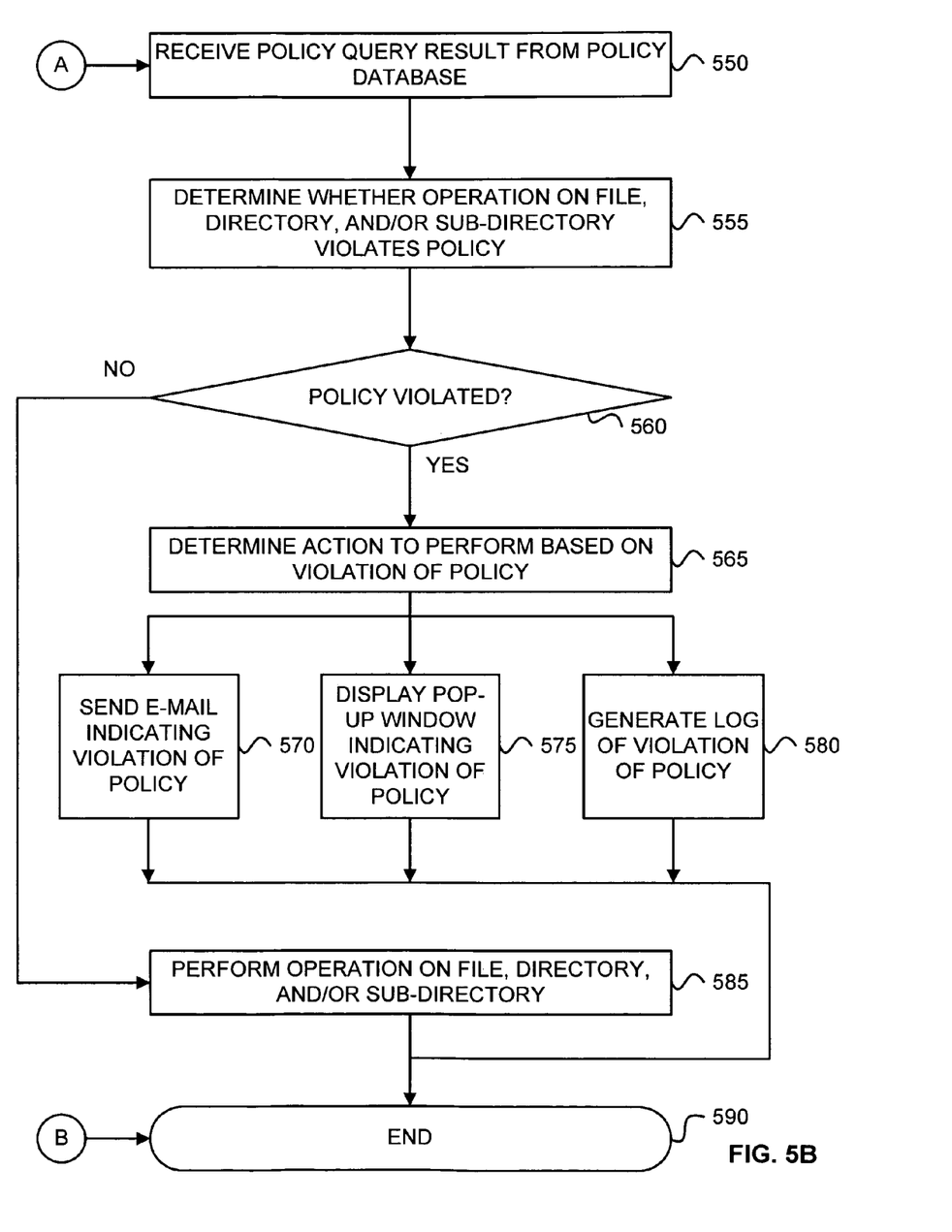

FIGS. 5A and 5B are flowcharts illustrating a method of operation of the NAS gateway 110 for retrieving policy identifiers in an inode (e.g., the inode 305 of FIG. 3) in an exemplary implementation of the invention. FIG. 5A begins in step 500. In step 505, the NAS gateway 110 receives a request to perform an operation on a file system object, such as a file, directory, and/or sub-directory based on a filename. Some examples of operations are to read a file, write a file, rename a file, create a file, and delete a file. In step 510, the NAS gateway 110 identifies an inode (e.g., the inode 305) for the file, directory, and/or sub-directory from the filename.

In step 515, the NAS gateway 110 reads the inode 305 for the file, directory, and/or sub-directory. In step 520, the NAS gateway 110 retrieves a policy identifier attribute from the inode 305. In step 530, the NAS gateway 110 determines whether to process a policy identifier (e.g., the policy ID 315) based on the policy identifier attribute. For example, before the NAS gateway 110 renames a file, directory, and/or sub-directory, the NAS gateway 110 determines from the policy identifier attributes whether the policy associated with the policy identifier 315 is related to the filename or extension of the file, directory, and/or sub-directory. The filename or extension of file is affected by the rename file system operation, and therefore the policy may be invoked. If the policy is independent of the filename, rather than a policy related to the amount of disk space consumed by file system objects with the filename or extension, for example, the NAS gateway 110 quickly skips looking up the policy by the policy identifier 315. If the NAS gateway 110 determines not to process the policy identifier 315 based on the policy identifier attributes, the method continues to step 590 in FIG. 5B.

If the NAS gateway 110 determines to process the policy identifier 315 based on the policy identifier attributes, the NAS gateway 110 retrieves the policy identifier 315 from the inode 305 in step 535. In step 540, the NAS gateway 110 generates a policy query including the policy identifier 315. The policy query is any information that identifies the policy. For example, the policy query includes the policy identifier 315. In another example, the policy query includes the policy identifier 315 and the file system operation to be performed. In step 545, the NAS gateway 110 transmits the policy query to the policy database 370 (FIG. 3).

In step 550, the NAS gateway 110 receives a policy query result from the policy database 370. In this example, the policy query, result includes the policy identified by the policy identifier 315. The policy query result is any information that the NAS gateway 110 uses to determine whether the operation violates the policy. In one example, the policy query result includes the rules that form the policy identified by the policy identifier 315. The NAS gateway 110 then will apply the rules to the operation on the file, directory, and/or sub-directory to determine whether execution or performance of the operation violates the policy. In another example, after the NAS gateway 110 transmits the policy query which includes the policy identifier 315 and details of the operation and the file, directory, and/or sub-directory, the returned policy query result includes a binary value: yes—to allow the operation, or no—to disallow the operation.

In step 555, the NAS gateway 110 determines whether the operation on the file, directory, and/or sub-directory violates the policy. For example, if the policy query result includes the rules of the policy, the NAS gateway 110 applies the rules to the operation to determine whether execution or performance of the operation violates the policy. The NAS gateway 110 may simulate performance or execution of the operation on the file, directory, and/or sub-directory to determine whether the operation violates the policy. If the policy is violated, then the NAS gateway 110 reads the data or commits the changes, if any, to the file system. If the policy query result includes the binary value: yes—to allow the operation, or no—to disallow the operation, the NAS gateway 110 determines from the "yes" that the operation is in compliance, and from the "no" that the operation is in violation. The NAS gateway 110 therefore does not expend resources simulating the operation on the file, directory, and/or sub-directory to determine compliance or violation of the policy.

If the policy will not be violated by the performance of the operation in step 560, the NAS gateway 110 then performs the operation on the file, directory, and/or sub-directory in step 585. If the policy will be violated by the performance of the operation in step 560, the NAS gateway 110 then determines an action to perform based on the violation of the policy in step 565. In step 570, the NAS gateway 110, for example, sends an e-mail message to a user, such as an administrator, indicating the violation of the policy. In step 575, the NAS gateway 110 may display a pop-up window on the display of an administrative user, indicating violation of the policy. In step 580, the NAS gateway 110 may generate a log of the violation of the policy. FIG. 5B ends in step 590.

Therefore, rather than storing the policy identifiers in a separate metadata file or parallel metadata inode, the above method increases locality of access to the file system object inodes and policy identifiers, and decreases latency when retrieving the policy identifiers. Furthermore, because the size of the inode (e.g., the inode 305) is not increased to store the policy identifiers, memory and disk footprints of the file system are conserved and caching efficiency increases. The filing system for a storage area network with inode based policy identifiers therefore receives an operation to perform on an object of the filing system, and retrieves a policy identifier from an inode for the object without the latency of referencing external databases and parallel metadata files.

The above-described functions can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. Those skilled in the art are familiar with instructions, processor(s), and storage media.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for operating a filing system for a storage area network, the method comprising:
    receiving an operation to perform on an object in the filing system, wherein the object is represented by a b+ tree in the filing system, wherein information relating to the operation to perform on the object in the filing system is stored in a non-volatile shared memory in the storage area network;
    retrieving a policy identifier from a localized, nonparallel inode for the object, the policy identifier including a policy identifier attribute;
    determining a policy from the policy identifier;
    determining whether execution of the operation is in compliance with the policy; and
    determining an action to perform based on the determination of compliance with the policy,
    wherein the policy identifier attribute includes at least one number, reference, identifier, or symbol identifying an attribute or a property of the policy,
    wherein a network attached storage gateway determines whether to look up the policy in a policy database based on the policy identifier attribute.

2. The method of claim 1 wherein the object comprises a file.

3. The method of claim 1 wherein the object comprises a directory.

4. The method of claim 1 wherein the policy comprises a quota.

5. The method of claim 1, further comprising executing the operation.

6. The method of claim 1 wherein the action comprises generating and transmitting a message indicating the determination whether execution of the operation is in compliance with the policy.

7. The method of claim 1, further comprising:
receiving user input to define the policy for the filing system;
determining the policy identifier for the policy;
determining where in the inode to store the policy identifier; and
storing the policy identifier in the inode.

8. The method of claim 1 wherein determining the policy from the policy identifier further comprises:
transmitting a policy query including the policy identifier to the policy database; and
receiving a policy query result indicating the policy.

9. The method of claim 8 further comprises:
receiving the policy query in the policy database; and
transmitting the policy query result from the policy database based on the policy identifier.

10. A filing system for a storage area network, the filing system comprising:
a processor configured to receive an operation to perform on an object of the filing system, retrieve a policy identifier from a localized, nonparallel inode for the object, determine a policy from the policy identifier, determine whether execution of the operation is in compliance with the policy, and determine an action to perform based on the determination of compliance with the policy; and
a storage device coupled to the processor and configured to store data,
wherein information relating to the operation to perform on the object in the filing system is stored in a non-volatile shared memory in the storage area network,
wherein the object is represented by a b+ tree in the filing system,
wherein the policy identifier includes a policy identifier attribute, the policy identifier attribute including at least one number, reference, identifier, or symbol identifying an attribute or a property of the policy,
wherein a network attached storage gateway determines whether to look up the policy in a policy database based on the policy identifier attribute.

11. The filing system of claim 10 wherein the object comprises a file.

12. The filing system of claim 10 wherein the object comprises a directory.

13. The filing system of claim 10 wherein the policy comprises a quota.

14. The filing system of claim 10 wherein the processor is further configured to execute the operation.

15. The filing system of claim 10 wherein the action comprises generating and transmitting a message indicating the determination whether execution of the operation is in compliance with the policy.

16. The filing system of claim 10 wherein the processor is further configured to receive user input to define the policy for the filing system, determine the policy identifier for the policy, determine where in the inode to store the policy identifier, and store the policy identifier in the inode.

17. The filing system of claim 10 wherein the processor is further configured to transmit a policy query including the policy identifier to the policy database, and receive a policy query result indicating the policy.

18. The filing system of claim 17, further comprising the policy database configured to receive the policy query in the policy database and transmit the policy query result based on the policy identifier.

19. A software product for a storage area network filing system, the software product comprising:
file system software operational when executed by a processor to direct the processor to receive an operation to perform on an object of the filing system, retrieve a policy identifier from a localized, nonparallel inode for the object, determine a policy from the policy identifier, determine whether execution of the operation is in compliance with the policy, and determine an action to perform based on the determination of compliance with the policy; and
a software storage medium operational to store the file system software
wherein information relating to the operation to perform on the object in the filing system is stored in a non-volatile shared memory in the storage area network,
wherein the object is represented by a b+tree in the filing system,
wherein the policy identifier includes a policy identifier attribute, the policy identifier attribute including at least one number, reference, identifier, or symbol identifying an attribute or a property of the policy,
wherein a network attached storage gateway determines whether to look up the policy in a policy database based on the policy identifier attribute.

20. The software product of claim 19 wherein the object comprises a file.

21. The software product of claim 19 wherein the object comprises a directory.

22. The software product of claim 19 wherein the policy comprises a quota.

23. The software product of claim 19 wherein the file system software is operational when executed by the processor to direct the processor to execute the operation.

24. The software product of claim 19 wherein the file system software is operational when executed by the processor to direct the processor to generate and transmit a message indicating the determination whether execution of the operation is in compliance with the policy.

25. The software product of claim 19 wherein the file system software is operational when executed by the processor to direct the processor to receive user input to define the policy for the filing system, determine the policy identifier for the policy, determine where in the inode to store the policy identifier, and store the policy identifier in the inode.

26. The software product of claim 19 wherein the file system software is operational when executed by the processor to direct the processor to transmit a policy query including the policy identifier to the policy database and receive a policy query result indicating the policy.

27. The software product of claim 26 wherein the policy database is configured to receive the policy query in the policy query database and transmit the policy query result from the policy database based on the policy identifier.

* * * * *